United States Patent [19]
Coleman

[11] Patent Number: 5,876,634
[45] Date of Patent: Mar. 2, 1999

[54] ELECTROCHROMIC TIN OXIDE

[75] Inventor: James P. Coleman, Maryland Heights, Mo.

[73] Assignee: Monsanto Company, St. Louis, Mo.

[21] Appl. No.: 773,210

[22] Filed: Dec. 23, 1996

Related U.S. Application Data

[60] Provisional application No. 60/009,226 Dec. 26, 1995.

[51] Int. Cl.$^6$ .................. H01B 1/08; B32B 5/16
[52] U.S. Cl. ................. 252/520.1; 428/402; 75/255
[58] Field of Search ............ 252/518.1, 520.1; 428/402; 75/255; 420/557, 562

[56] References Cited

U.S. PATENT DOCUMENTS

| | | | |
|---|---|---|---|
| 3,978,007 | 8/1976 | Giglia et al. | 252/506 |
| 4,160,241 | 7/1979 | Shimizu et al. | 340/763 |
| 4,280,754 | 7/1981 | Yano et al. | 350/357 |
| 4,342,031 | 7/1982 | Lepeyre | 340/756 |
| 4,354,741 | 10/1982 | Mano et al. | 350/357 |
| 4,465,339 | 8/1984 | Baucke et al. | 350/357 |
| 4,550,982 | 11/1985 | Hirai | 350/357 |
| 4,596,722 | 6/1986 | Warszawski | 427/108 |
| 4,652,090 | 3/1987 | Uchikawa et al. | 350/357 |
| 4,746,200 | 5/1988 | Kamigaki | 350/357 |
| 4,750,817 | 6/1988 | Sammells | 350/357 |
| 4,810,067 | 3/1989 | Demiryont | 350/357 |
| 4,824,221 | 4/1989 | Endo et al. | 350/357 |
| 4,893,903 | 1/1990 | Thaker et al. | 350/331 |
| 4,902,110 | 2/1990 | Green | 350/357 |
| 4,966,675 | 10/1990 | Steininger | 209/490 |
| 5,011,582 | 4/1991 | Oshikawa et al. | 204/140 |
| 5,078,480 | 1/1992 | Warszawski | 359/265 |
| 5,104,583 | 4/1992 | Richardson | 252/518 |
| 5,189,549 | 2/1993 | Leventis et al. | 359/271 |
| 5,216,536 | 6/1993 | Agrawal et al. | 359/274 |
| 5,227,252 | 7/1993 | Murayama et al. | 428/690 |
| 5,284,705 | 2/1994 | Cahill | 428/328 |
| 5,413,739 | 5/1995 | Coleman | 252/511 |
| 5,442,478 | 8/1995 | Lampert et al. | 359/273 |
| 5,500,759 | 3/1996 | Coleman | 359/270 |
| 5,545,250 | 8/1996 | Bergmann et al. | 75/252 |
| 5,707,556 | 1/1998 | Babinec et al. | 252/518 |

FOREIGN PATENT DOCUMENTS

| | | | |
|---|---|---|---|
| 966923 | 4/1975 | Canada | 345/55 |
| 1154135 | 6/1983 | Canada | G02F 1/17 |
| 386932 A1 | of 0000 | European Pat. Off. . | |
| 441427 A1 | of 0000 | European Pat. Off. . | |
| 627385 A1 | of 0000 | European Pat. Off. . | |
| 0193978 | 9/1986 | European Pat. Off. | C25D 13/08 |
| 0 359 569 A2 | 9/1989 | European Pat. Off. . | |
| 0333700 | 9/1989 | European Pat. Off. | H01M 4/00 |
| 0341554 | 11/1989 | European Pat. Off. | D06M 11/12 |
| 0 359 569 | 3/1990 | European Pat. Off. . | |
| 0403180 | 12/1990 | European Pat. Off. | C09C 1/62 |
| 0486387 | 5/1992 | European Pat. Off. | G02F 1/153 |
| 587105 | 3/1994 | European Pat. Off. . | |
| 38109293 | 10/1988 | Germany | G02F 1/17 |
| 41 03 231 | 8/1992 | Germany . | |
| 59-113422 | 6/1984 | Japan | G02F 1/17 |
| 0226064 | 12/1984 | Japan . | |
| 0099174 | 6/1985 | Japan . | |
| 0181172 | 9/1985 | Japan . | |
| 62-044719 | 2/1987 | Japan | G02F 1/17 |
| 62-049333 | 3/1987 | Japan | G02F 1/17 |
| 63-199325 | 8/1988 | Japan . | |
| 63-207856 | 8/1988 | Japan | C08L 101/00 |
| 1107135 | 4/1989 | Japan | G01N 21/77 |
| 0229964 | 11/1989 | Japan . | |
| 3275658 | 11/1989 | Japan . | |
| 06 183 708 | 7/1994 | Japan . | |
| 07133374 | 5/1995 | Japan . | |
| 61-185730 | 8/1996 | Japan | G02F 1/17 |
| WO 87/01515 | 3/1987 | WIPO | H01M 2/02 |
| WO 92/18896 | 10/1992 | WIPO | G02F 1/155 |
| WO 92/19694 | 11/1992 | WIPO | C09K 9/02 |
| WO 93/21557 | 10/1993 | WIPO | G02F 1/15 |
| WO 93/21558 | 10/1993 | WIPO | G02F 1/155 |
| WO 93/22707 | 11/1993 | WIPO | G02F 1/53 |
| WO 94/15246 | 7/1994 | WIPO | G02F 1/15 |
| WO9606437 | 2/1996 | WIPO . | |

OTHER PUBLICATIONS

Nomura et al., J. Macromol. Sci.–Chem., A26(2&3), pp. 593–608 (1989), Electrochemical and Electrochromic Properties of Polymer Complex Films Composed of Polytetramethyleneviologen and Poly–[p–styrenesulfonic Acid] Containing a Conductive Powder. no month.

Masumi, Proc. of SID 1982, vol. 23/4, pp. 245–248, "Response–Improved Electrochromic Display Based on Organic Materials".

Orel et al., J. Electrochem. Soc. vol. 141, No. 9, pp. L127–L130, Sep., 1994, "Electrochemical and Structural Properties of $SnO_2$ and $Sb:SnO_2$ Transparent Electrodes with Mixed Electronically Conductive and Ion–Storage Characteristics".

*Primary Examiner*—Mark Kopec
*Attorney, Agent, or Firm*—Howell & Haferkamp, LC

[57] ABSTRACT

Tin oxide doped with an electrochromically effective amount of a metal, e.g. antimony or niobium, which provides a color change when the doped tin oxide is exposed to an electrochemical potential in the presence of mobile ions. Particles of electrochromic doped tin oxide, e.g. coated on a white or pastel pigment substrate, have a contrast ratio greater than 1.2, where contrast ratio is a measure of electrochromic functionality of a material and is the ratio of reflectance of the material in an oxidized state to the color of the material in a reduced state and where color is a photodiode measurement of the value of light reflected off the oxidized or reduced material from a constant source of light shining on the material. Such doped tin oxide-containing particles are useful as electrochromic material in display devices.

14 Claims, No Drawings

ELECTROCHROMIC TIN OXIDE

This application claims the benefit of U.S. Provisional Application No. 60/009,226, filed Dec. 26, 1995.

Disclosed herein are novel electrochromic materials comprising tin oxide-containing particles having a high contrast and methods of making and using such materials, e.g., in electrochromic devices.

BACKGROUND OF THE INVENTION

Doped tin oxides are known among metal oxides for their relative transparency and high electrical conductivity. These properties are advantageously employed in a variety of electro-optical applications, e.g., providing transparent conductive coatings on particles or surfaces. One such application is the fabrication of transparent electrodes on electrochromic display devices which typically have an electrolyte material in contact with an electrochromic material so that an electrochromic effect is generated when an electric potential is applied across the interface of the two materials. When electrodes are provided on both sides of the materials, e.g., in sandwich-like structure, the electrode on at least one side of the display laminate needs to be relatively transparent to permit observation of the electrochromic effect. In such devices typical electrochromic materials include tungsten oxide, Prussian Blue, polyaniline and viologens. Transparent electrodes have been fabricated by vapor deposition of antimony-doped tin oxide (ATO) coating on a glass or plastic substrate.

Although doped tin oxides have been employed as transparent conductors in electrochromic devices, it appears that the possibility that doped tin oxide might be useful as a practical electrochromic material has not been discovered. For instance, Orel et al. reported in the Journal of the Electrochemical Society, Vol. 141, page L127 (1994) that a film of ATO exhibited a change in light reflectance between a reduced and oxidized state of less than 5%, which corresponds to a contrast ratio (as defined hereinbelow) of less than 1.05. Because such a change in color is not readily discernable to the typical human eye, it has not been recognized or discovered that doped tin oxides have useful electrochromic properties.

A variety of dopants are used to make conductive metal oxides, some of which, e.g., fluorine-doped tin oxides are not known to exhibit any useful electrochromic effect regardless of modification. Similarly, ATO, when provided in film form, also does not exhibit any useful electrochromic effect. When select doped tin oxides, e.g., ATO and niobium-doped tin oxide, are provided in particle form in an electrochromic generating environment, a surprising electrochromic effect is achieved. Thus, this invention is directed to the surprising discovery that certain of the conductive doped tin oxides can be useful high contrast electrochromic materials and to electrochromic devices employing such electrochromic doped tin oxides.

SUMMARY OF THE INVENTION

This invention provides novel electrochromic materials comprising doped tin oxide having a high contrast ratio between different oxidation states. These high contrast electrochromic tin oxide materials are doped with an electrochromically-effective amount of a metal that provides a color change when exposed to ion transfer in an electric field. Preferred dopants are antimony and niobium.

The invention also provides methods of making such electrochromic tin oxide materials, for instance in the case of antimony-doped tin oxide materials by employing higher levels of antimony than commonly used in conductive tin oxide applications.

This invention also provides methods of advantageously using such electrochromic tin oxide materials, e.g., in display devices. More particularly, this invention also provides a method of producing an electrochromic effect by applying an electrochemical potential to doped tin oxide in contact with mobile ions.

This invention also provides particulate antimony-doped tin oxide that is oxidized or reduced to provide a powder resistivity which is at least two times the powder resistivity of a base antimony tin oxide compound. Such resistive antimony-doped tin oxide is also uniquely colored as compared to analogous tin oxides that are highly conductive and transparent.

This invention also provides electrochromic devices comprising such high contrast, electrochromic tin oxide materials. Such devices are typically laminate structures comprising a layer of electrochromic material in contact with an ion-supplying electrolyte layer.

DETAILED DESCRIPTION OF PREFERRED EMBODIMENTS

Percentages expressed herein as "%" are mole percent unless indicated otherwise, e.g. weight percent is expressed as "wt %".

As used herein "powder resistivity" means an electrical resistivity measured with a two probe apparatus on powder compressed at high pressure in a confined but defined space. The two probes of the apparatus comprise metal, e.g. stainless steel, rods about 6.5 mm in diameter and extending about 15 mm from the center of a plate, e.g. a disk that is 9 mm thick and 5 cm in diameter; the disks are electrically connected to an ohm-meter. The overall length of the extended rods is slightly longer than the length of a hole in a non-conducting, e.g. acrylic polymer, cylinder reinforced by a surrounding metal, e.g. aluminum, sleeve and having a central bore that is slightly larger than the diameter of the rods. To measure powder resistivity, the cylinder is mounted on one disc with the rod inserted into the bore; the open bore is partially filled with particulate material which is compressed by pressing the second rod into the bore. Resistance is measured by an ohm-meter when the pressure on the powder is 845 kilograms per square centimeter (which is equivalent to 12,000 psi). At that pressure the height of compressed particles in the bore ($H_p$) is determined by measuring the space between the discs in centimeters with a micrometer. The cross sectional area of the rod ($A_r$) is 0.3318 square centimeters. Powder resistivity (p) is determined by multiplying the measured resistance by the ratio of cross sectional area ($A_r$) to height of compressed particles in the bore ($H_p$).

As used herein the terms "oxidized" and "reduced" mean changing the number of electrons associated with a valence state of a material by chemical or electrochemical means. An oxidized metal oxide is a material that has fewer electrons than the same metal oxide material in its natural state. Conversely, a reduced metal oxide is a material that has more electrons than the same metal oxide material in its natural state. A common chemical reducing agent is sodium borohydride which is capable of putting electrons accompanied by ions, e.g. protons or other cations such as sodium, lithium, etc., into a tin oxide lattice. In a reduced state, e.g. when saturated with electrons, doped tin oxide has a darker color and lower conductivity. Interestingly, the conductivity of both reduced and oxidized doped tin oxide is significantly lower than the conductivity of doped tin oxide in the natural state. The conductivity of oxidized doped tin oxide is lower because the number of electron carriers is substantially lower. The conductivity of reduced doped tin oxide is lower because the material is so saturated with electrons that electron mobility is impaired. To achieve an electrochromic effect it is believed that it is necessary to cause an electrochromic-generating oxidation or reduction at the surface of the electrochromic material, e.g. typically by applying an electrical potential of 1.5 volt or less to cause cations and electrons to migrate into or out of the surface layer of the electrochromic material.

As used herein the term "contrast ratio" (CR) describes the difference in color of a material in oxidized and reduced states. More particularly, contrast ratio means the ratio of reflectance of a material in an electrochemically oxidized state to the reflectance of the material in an electrochemically reduced state, where reflectance is a photo diode measurement of the value of light reflected off the oxidized or reduced material from a constant source of light shining on the material. A material having a CR=1 would have no electrochromic effect, that is the light reflected from the material in a reduced state would be immeasurably different from the light reflected from the material in an oxidized state. The electrochromic tin oxide materials used in the electrochromic devices of this invention have a CR of at least 1.2 or higher, say at least 1.4 or 1.6. Preferred electrochromic tin oxide materials of this invention have a CR of at least 1.8 or higher, say at least 2 or 3. More preferred electrochromic tin oxide materials of this invention have a CR of at least 4 of higher, say at least 4.5 or 5.

A material is said to be in an oxidized state when it has fewer electrons than in the reduced state. For instance, in oxides, antimony has two stable oxidation states with two or zero electrons in the outer shell. These are denoted as Sb(III) and Sb(V). In the mixed oxide compound ATO, as naturally formed, the antimony atoms in the metal oxide lattice are at an oxidation state intermediate between III and V with electrons from the antimony in a tin 5S electron orbital based conduction band. In ATO the natural blue grey color is believed to be due to a charge transfer absorption band.

For electrochromic metal oxides, e.g. ATO, I have now shown that the wide ranges of color and conductivity in metal oxide powders are possible for a given ratio of dopant to base metal by changing the oxidation state of the material, i.e. changing the number of electrons. For instance, in the case of ATO, the number of delocalized electrons associated with the antimony can be changed by either chemical or electrochemical oxidation or reduction.

In particular, in oxidized ATO electrons are removed from the material effectively transforming the antimony to a species closer to antimony V which has no free electrons and essentially no color; there are no delocalized electrons remaining to undergo charge transfer. Conversely, in reduced ATO there is an increase in delocalized electrons in the metal oxide, resulting in more charge transfer light absorption and hence more color. In a natural state, e.g. without exposure to an electrical potential causing oxidation or reduction, natural ATO has an inherently translucent blue grey color where the intensity and hue of the color is a function of the antimony in the mixed metal oxide.

In describing dopants it is useful to use mole ratios of metal components in the tin oxide material. Unless otherwise indicated, the amount of dopant in a tin oxide will be expressed as a mole ratio. For example, 6% ATO describes tin oxide doped with antimony where the number of moles of antimony as a percent of the combined moles of antimony and tin is 6%.

Factors affecting contrast ratio of a doped tin oxide include the amount of dopant and the covering power, i.e. ability to absorb light, of optional adjuvant materials such as pigmented particles mixed with doped tin oxide particles or providing a substrate for a doped tin oxide coating.

Although doped tin oxide is typically considered transparent or translucent, especially when applied as a film, particular doped tin oxide can have perceptible color, perhaps due at least in part to the interaction of light with the particle. Thus, factors affecting color within the realm of routine experimentation include particle size, amount of dopant, crystallite size and dimensional thickness of the doped tin oxide material. For instance, particles of 10% ATO have what appears to be a dark gray color. While the dark gray-colored, doped tin oxide can be used in electrochromic devices, the contrast is often not optimal since reduced tin oxides generally get darker in color, leaving little room in the chromatic spectrum for adequate contrast in display images. It has been discovered, however, that when doped tin oxide is used in combination with a light-colored pigment substrate, that the lighter color of the pigment imparts a lighter natural color that provides significantly greater contrast when the doped tin oxide is reduced and/or oxidized. Thus, in providing material for use in electrochromic displays, it is often preferred to provide the doped tin oxide with a light-colored adjuvant, e.g. a white or pastel colored pigment, that will provide a light background color visible through a generally transparent or at least translucent, doped tin oxide. The doped tin oxide and pigment can be provided as a mixture of particles. It is preferable to provide the doped tin oxide as a coating on, or in admixture with, a light colored adjuvant substrate. Useful adjuvant pigments include titanium dioxide ($TiO_2$), mica, aluminum borate, silica, barium sulfate and alumina. When doped tin oxide is used in a mixture with pigment particles, the pigment material is preferably less electrochemically active in aqueous electrolytes than is the doped tin oxide. When used with a light colored pigment adjuvant as a substrate for doped tin oxide, the amount of doped tin oxide in the coating is not critical so long as the particle is sufficiently conductive. Unless otherwise indicated, the relative amounts of doped tin oxide and pigment will be expressed as weight ratio, e.g. a weight ratio of doped tin oxide to pigment substrate in the range of 1:4 to about 4:1. Useful pigments have particle size of micrometer (micron) scale, e.g. with a nominal diameter in the range of about 0.05 to 20 microns and more typically about 0.2 to 10 microns and more preferably about 1 to 5 microns.

When the adjuvant material is particulate $TiO_2$—a commonly used pigment material with exceptionally high covering power—it has been found that 6% ATO coated onto $TiO_2$ in the weight ratio 2:3 ATO/$TiO_2$ has a CR of 1.2. When the antimony in ATO is increased to about 11 mole percent, the CR is 1.6. A number of ATO coated $TiO_2$ pigments which are commercially available as conductive metal oxide particles having from 1 to about 13% antimony are useful in the displays of this invention. For instance, a light grey conductive powder comprising 12.25% ATO on 0.2 micron $TiO_2$ particles in the weight ratio of 23:77 is available from Mitsubishi Materials Company Ltd. as W-1 conducting particles. Grey conductive powders comprising 12.3% ATO on 1 to 5 micron $TiO_2$ particles in the weight ratio of 33:77 are available from E. I. Dupont de Nemours and Company under the tradenames Zelec® 141TO and 341TO. Such commercially available materials have a CR of about 1.6. When the antimony is increased to 22 mole percent, the CR is surprisingly increased to a value greater than 2. Thus, one aspect of this invention provides novel ATO coated $TiO_2$ particles having a CR greater than 1.6, e.g. at least about 1.8, more preferably greater than 2.

When other pigments with less covering power than $TiO_2$ are used, e.g. ATO on aluminum borate (at a weight ratio of about 0.5), it has been discovered that doped tin oxide materials with an exceptionally high CR, e.g. up to about 4–5 can be produced. More particularly it has been discovered that certain commercially available conductive powders comprising ATO on pigments such as aluminum borate, barium sulfate, zinc oxide, silica and mica, are surprisingly electrochromic. In particular, a grey conductive powder with a surprisingly high contrast ratio, i.e. greater than 4, is 11.5% ATO on 4 micron aluminum borate particles in the weight ratio of 54:46 available from Mitsui as Passtran 5210 Type V conducting particles.

The doped tin oxide materials of this invention can be obtained from commercial sources or produced by well-known methods with appropriate adjustment in materials, e.g. dopant level and the amount and nature of adjuvant pigment, for optimal electrochromic effect. For instance, ATO-coated $TiO_2$ according to this invention can be prepared by adding an hydrochloric acid-acidified aqueous solution of antimony chloride (e.g., the trichloride or the pentachloride) and tin tetrachloride to an aqueous dispersion of $TiO_2$ particles, with simultaneous addition of sodium hydroxide to maintain pH at about 2. This process produces non-conductive metal hydroxide coated $TiO_2$ particles which are converted to conductive, doped tin oxide coated particles when heated to liberate water, e.g., in the range of 300° to 700 ° C.

This invention provides particulate antimony-doped tin oxide that is oxidized or reduced to provide a tin oxide compound that has a powder resistivity which is at least two times the powder resistivity of a base antimony tin oxide compound. Particulate antimony-doped tin oxide is commonly made by thermally treating a mixed antimony and tin compound. For instance, antimony-doped tin oxide can also be prepared by precipitating mixed hydroxide particles from a solution of mixed antimony and tin followed by thermal treatment, preferably at a temperature greater than 350 ° C., to form particles of base antimony tin oxide compound. The electrical resistivity of base ATO depends on a number of variables, e.g. particle size and level of antimony dopant, and can typically range from 0.05 to 10 ohm-cm. With such a wide range of base powder resistivity it is expected that there can be some overlap with the range of increased resistivity for oxidized or reduced tin oxide compounds. It has been found that the powder resistivity is increased more substantially when the doped tin oxide is reduced rather than oxidized. For instance, as shown in the following examples, a commercial ATO having a powder resistivity of 0.12 ohm-cm can be reduced to provide a powder resistivity of about 400 ohm-cm or oxidized to provide a powder resistivity of about 5 ohm-cm. With heat treatment the powder resistivity can be returned to a value in the range of the original. When such a base antimony-doped tin oxide is oxidized or reduced there is provided a resistive, particulate antimony-doped tin oxide that is characterized as having a powder resistivity which is at least two times the powder resistivity of said base antimony tin oxide compound. Preferably such resistive, particulate antimony-doped tin oxide particles will have a nominal dimension in the range of 0.2 to 10 micrometers. Such resistive particulate doped tin oxide being oxidized or reduced will also exhibit desirable electrochromic properties.

When the electrochromic doped tin oxide materials of this invention are used in electrochromic display devices, such materials are typically disposed in a laminate structure, e.g. a layer of electrochromic material in contact with a layer of ion-supplying electrolyte. Alternatively, displays can be fashioned by providing a layer comprising electrochromic particles in a electrolyte matrix. Commonly, an electrical potential is applied across the materials by electrodes so that a potential is created at an interface of electrochromic material and electrolyte. Such electric potential causes ions, such as protons, lithium ions or sodium ions, to migrate into or out of the electrochromic material, causing the electrochromic effect-generating reduction or oxidation. Useful electrochromic displays can be prepared using the electrochromic doped tin oxide materials of this invention by following the display fabrication principles set forth in my earlier U.S. Pat. No. 5,413,739 or other principles apparent to those skilled in the art.

This invention also provides electrochromic devices useful for displays. Such devices preferably comprise a layer of electrochromic material in contact with an ion-supplying electrolyte layer. In a preferred embodiment the layer of electrochromic material comprises high contrast, electrochromic, doped tin oxide as disclosed herein and dispersed in a transparent or translucent polymer matrix in an amount such that the material is electrically conductive. The polymer of the matrix can comprise any of a variety of common polymers, e.g. preferably a non-brittle polymer such as a tough elastomeric or rubbery polymer such as nitrile rubber, butyl rubber or butyl acrylate, that is amenable to incorporation of dispersed particles of this invention. The polymer matrix can be ionically isolative, e.g. a butyl rubber, or ionically conducting, e.g. a sulfonated polymer such as sulfonated polystyrene or Nafion ionomer. The electrolyte layer is also desirably transparent or, at least, translucent. While the ion-supplying electrolyte material can comprise a salt dissolved in an aqueous or organic solvent-containing polymeric gel, a preferred electrolyte material is an ionically conductive, aqueous polymeric gel which can contain a humectant or hygroscopic filler. Useful hygroscopic material includes deliquescent material such as lithium chloride, calcium chloride, glycerine, sodium dihydrogen phosphate or lithium trifluoromethyl-sulfonate. A preferred aqueous polymeric gel is polyacrylamidomethyl-propanesulfonate, known as POLYAMPS.

In such electrochromic devices the electrochromic metal oxide material serves as an electrode for transporting electrons into or out of the ionically conductive electrolyte media. Concurrent with such electron transfer is the movement of ions across an interface between said layer of electrochromic material and said ion-supplying electrolyte layer. In preferred embodiments of this invention the electrodes can be side by side electrodes as disclosed in my earlier U.S. Pat. No. 5,413,739. Such side by side electrodes are located behind, e.g. hidden by, the electrochromic layer of the device.

In order for such electrodes to function, they must be connected to an electrical potential by current feeders, e.g. conductive leads, which can comprise any of a variety of conductive materials such as silver ink, carbon ink, metal oxide ink or deposition where the metal oxide is a conductive metal oxide such as ATO. Alternatively, the electrodes can be in a sandwich disposition such that at least one of the electrodes should be of transparent or translucent material to allow observation of the electrochromic effect. Such transparent electrode material is preferably a conductive metal oxide such as ATO. When used as a current feeder, ATO has an optimally high conductivity in the range of 6–10% ATO. When the transparent metal oxide electrode is used in a sandwich type display, the current feeder is typically an integral film coating. It is believed that ATO in a film form, as compared to the particulate doped tin oxide materials of this invention, has such a low contrast ratio as to be considered non-electrochromic; that is, the contrast ratio is less that 1.2.

While the following examples illustrate the preparation and use of various embodiments of the electrochromic doped tin oxides and electrochromic displays of this invention, it should be clear from the variety of the examples herein that there is no intention of so limiting the scope of the invention. On the contrary, it is intended that the breadth of the inventions illustrated by reference to the following examples will apply to other embodiments which would be obvious to practitioners in the electrochromic arts.

EXAMPLE 1

This example illustrates one embodiment of an electrochromic device according to this invention using commercially available ATO coated $TiO_2$ particles. 1.5 grams (g) of light grey conductive powder comprising 12.25% ATO on 0.2 micron $TiO_2$ particles in the weight ratio of 23:77 from Mitsubishi Materials Company Ltd and identified as W-1 conducting particles was dispersed in 5 g of a 10% solution of styrene-butadiene-styrene (SBS) rubber in toluene. A copper coated polyester film was used as a electrode substrate. The dispersion was coated as a film onto the copper layer and dried with a heat gun to evaporate the toluene solvent. The coated substrate was immersed in an aqueous electrolyte solution comprising 5% sodium sulfate. With the application of 1 to 2 volts, the coating turned a visibly darker grey color than the original color of the coating. Reversing the polarity caused a rapid reversal to a lighter grey color that was visibly lighter than the original color of the coating.

EXAMPLE 2

This example illustrates the fabrication of an electrochromic display device. A first display conductor pattern was printed in the shape of a 25 millimeter (mm) square centered on a supporting substrate of polyester film with a narrow conductor lead running from the 25 mm square to the edge of the polyester substrate. A counter electrode conductor was printed in the shape of a 12 mm wide line bordering the square pattern and lead at a distance of about 1 millimeter from the edge thereof. Each conductor pattern was printed with a conventional silver ink and coated with a conventional carbon ink. An electrochromic display was fabricated by overcoating the conductor pattern with a dispersion of 12% ATO-coated $TiO_2$ in a solution of fluorinated elastomer; the 12% ATO-coated $TiO_2$ was obtained from Mitsubishi Materials Company Ltd. and is characterized as light grey conducting powder having a particle size of 0.2 micron with ATO and $TiO_2$ present in the weight ratio of 23:77. The fluorinated elastomer was dissolved at 22 weight percent (wt %) in butoxyethyl acetate. Sufficient ATO coated powder was dispersed in the elastomer solution so that the weight ratio of ATO-coated powder to elastomer was 2.5:1. The conductor pattern was coated with the dispersion except for the lead portions thereof at the edge of the substrate where electrical connections could be made. The dispersion coating was dried at 130 ° C. for 10 minutes, recoated with dispersion and redried to provide an electrically conducting, essentially pin hole-free coating of light grey-colored, electrochromic, doped tin oxide particles dispersed in a transparent, ionically insulating elastomer matrix, designated as a "basic ATO-coated display element". The electrochromic layer of the basic ATO-coated display element was covered with a stack of adhesive polyester gaskets to provide an electrolyte well over the electrode area; the well was about 1 millimeter (mm) in depth and was filled with electrolyte comprising an aqueous solution of 30 wt % lithium chloride and 5 wt % acrylic polymer thickener, i.e. Acrysol ASE-95 from Rohm and Haas Company. The electrolyte filled well was sealed with adhesive polyester film to complete the construction of electrochromic display device designated D1.

EXAMPLE 3

This example illustrates the measurement of contrast ratios for an electrochromic doped tin oxides operating in an electrochromic effect-generating environment. The conductor leads of the electrochromic display device D1 prepared in Example 2 were connected to a function generator which applied a 50 milliHertz, ±1.5 volt square wave potential to drive the electrochromic device causing the electrochromic ATO-coated particles visible through the electrolyte coating to cycle between a light grey and a dark grey color as the ATO was sequentially oxidized and reduced. The magnitude of the contrast ratio of the color change was determined by fitting the device under a microscope fitted with a Melles-Griot photodiode wide band width amplifier. The electrochromic, 12% ATO-containing material in the device exhibited a contrast ratio of 1.38.

EXAMPLE 4

This example illustrates the dramatic effect of an increased amount of antimony in electrochromic properties of ATO. A basic ATO-coated display element prepared according to Example 2 was coated with an additional electrochromic dispersion and fabricated into an electrochromic display in essentially the same manner of Example 2 except for the use of 33% ATO. The contrast ratio measured in the manner of Example 3 was 1.92.

EXAMPLE 5

This example further illustrates the dramatic effect of an increased amount of antimony in electrochromic properties of ATO. A set of basic ATO-coated display elements prepared according to Example 2 were coated with an additional electrochromic dispersion and fabricated into an electrochromic display in essentially the same manner of Example 2 except that the doped tin oxide comprised antimony in the range of 11 to 60 percent and that the ATO and $TiO_2$ were in the weight ratio of 36:64. The contrast ratio measured in the manner of Example 3 is reported in Table 1.

TABLE 1

| % Sb | CR |
| --- | --- |
| 11 | 1.6 |
| 23 | 2.0 |
| 33 | 2.14 |
| 43 | 2.19 |
| 47 | 2.17 |
| 55 | 1.74 |
| 60 | 1.94 |

EXAMPLE 6

This example illustrates the dramatic increase in electrochromic effect achieved by selection of substrate pigment. An ATO-coated display element prepared similar to the procedure of Example 2 was further coated with an electrochromic dispersion of 12% ATO-coated onto aluminum borate (obtained from Mitsui as Passtran 5210 conductive powder) in a fluorocarbon elastomer solution. In the dried electrochromic top coat the weight ratio of ATO-containing particles to fluorocarbon elastomer was 28:15. An electrochromic device prepared as in the manner of Example 2 and evaluated in the manner of Example 3 showed that the doped tin oxide on an aluminum borate substrate had a contrast ratio of 5.14.

EXAMPLE 7

This example illustrates the preparation of an electrochromic, niobium-doped tin oxide according to this invention. A barium sulfate slurry was provided by dispersing 50 g of barium sulfate powder in 750 ml of water and heating to 75 ° C.; the slurry was adjusted to pH 12 with 25% sodium hydroxide solution. A tin solution (98.5 g of sodium stannate trihydrate in 250 ml of water at 75° C.) was added to the slurry. After stirring for 30 minutes, an acidic niobium solution (0.735 g niobium trichloride in 25 ml methanol acidified with 270 cc of 20% sulfuric acid) was added to the tin oxide-containing slurry over a 90 minute period. The pH of the niobium/tin-containing slurry was adjusted to 2.5 with 20% sulfuric acid. After 3 hours the solution was cooled and filter washed 10 times with 250 ml of water, providing particles that were dried in a vacuum oven at 130° C. The dried particles were calcined for 2 hours under nitrogen at 450° C. to provide electrochromic 0.72% niobium-doped tin oxide coated barium sulfate substrate particles having a contrast ratio of 1.54.

EXAMPLE 8

This example illustrates the utility of mixtures of doped tin oxide particles and pigment particles as an electrochromic material. A mixture of 0.4 g of 13.4% ATO particles (commercially available from DuPont as Zelec® 3010XC ATO) and 0.15 g of $TiO_2$ particles was dispersed in 1 g of 22 wt % fluoroelastomer solution in butoxyethyl acetate to provide a dispersion suitable for use in an electrochromic display as described herein. The material exhibited a contrast ratio of 2.4.

EXAMPLE 9

This example illustrates the high resistance of oxidized or reduced doped tin oxide particles according to this invention. ZELEC 35005XC ATO obtained from DuPont was determined to have a base ATO powder resistivity of 0.12 ohm-cm. The base ATO was treated with sodium borohydride, washed and dried to provide reduced ATO (having 0.58% sodium ions) having a powder resistivity of 404 ohm-cm. The base ATO was treated with ammonium persulfate to provide oxidized ATO having a powder resistivity of 5.5 ohm-cm. When the oxidized ATO is heated, the powder resistivity returns to a value close to 0.1 ohm-cm.

While specific embodiments have been described herein, it should be apparent to those skilled in the art that various modifications thereof can be made without departing from the true spirit and scope of the invention. Accordingly, it is intended that the following claims cover all such modifications within the full inventive concept.

What is claimed is:

1. A particle comprising electrochromically activated doped tin oxide, said doped tin oxide being electrically conductive in an electrochromically unactivated state, and said activated, doped tin oxide electrochromically exhibiting a contrast ratio greater than 1.2 in comparison to the doped tin oxide in the electrochromically unactivated state.

2. A particle according to claim 1 comprising a doped tin oxide coated on a white or pastel pigment substrate.

3. A particle according to claim 1 comprising an electrochromically effective amount of a metal dopant which provides a color change when said doped tin oxide is exposed to ion transfer in the presence of an electrochemical potential sufficient to cause a redox change in said particle.

4. A particle according to claim 3 wherein said tin oxide is doped with antimony or niobium.

5. A particle according to claim 4 wherein said contrast ratio is at least 2.

6. A particle according to claim 5 doped with antimony.

7. A particle according to claim 2 wherein said pigment substrate is titanium dioxide, silica, alumina, mica, barium sulfate, aluminum borate or a mixture thereof.

8. A particle according to claim 7 wherein said particle has a nominal size in the range of 0.05 to 20 micrometers.

9. A particle according to claim 7 wherein said particle has a nominal size in the range of 0.2 to 10 microns.

10. A particle according to claim 7 wherein said particle has a nominal size in the range of 1 to 5 microns.

11. A particle according to claim 1 in admixture with a white or pastel pigment, wherein the contrast ratio of the mixture is greater than 1.2.

12. A particle according to claim 1 comprising niobium-doped tin oxide over a barium sulfate substrate.

13. A particle according to claim 12 having a contrast ratio greater than 1.5.

14. A particle according to claim 12 prepared by:
   (a) adding a tin solution to a dispersion of an insoluble substrate particle in a basic solution,
   (b) stirring and adding an acidic niobium solution to the resulting mixture to produce an acidic niobium/tin-containing slurry, and
   (c) filtering and drying the particles in the slurry.

* * * * *